9555X
A. Turney,
Expanding Rock Drill.
Patented Mar. 30, 1836
NO PRINTED COPY OF SPECIFICATION IN OFFICE.
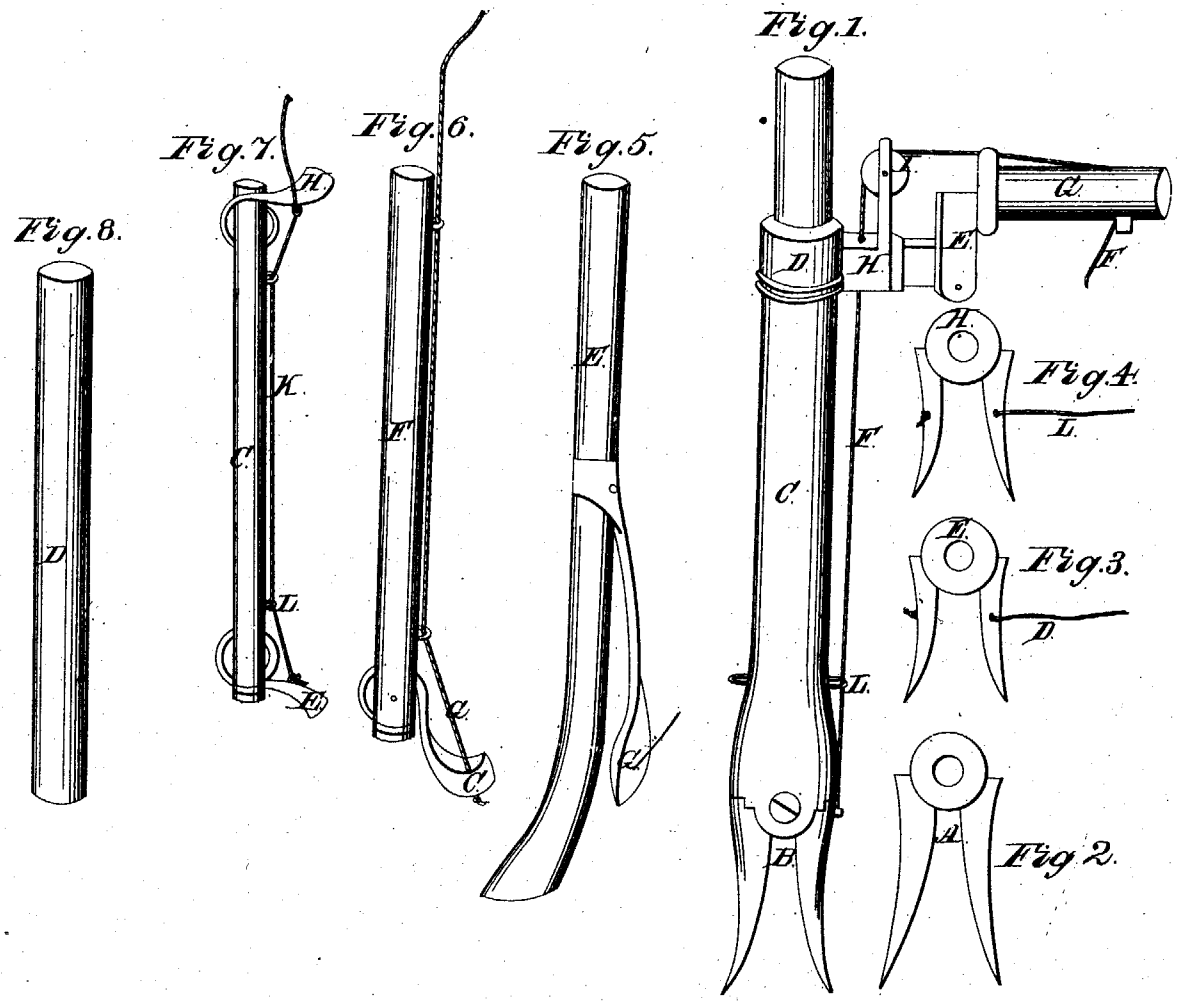

Andrew Turney, of Reading, State of Connecticut.

Letters Patent.

The Schedule referred to in these Letters Patent and making part of the same containing a description in the words of the said Andrew Turney himself of his improvement in the machine for boring stone for blasting To all to whom these presents shall come, Be it known that I, Andrew Turney of Reading in the County of Fairfield and State of Connecticut, have invented and applied to use a new and useful improvement or Machine for boring rocks or stone for blasting, called Andrew Turney's improved stone auger and that the following with the annexed drawings is a full and accurate description thereof.

This invention consists of a shank C, in fig 1. upon the annexed drawing, to be of a length and diameter corresponding with the size and depth of the hole to be bored. To this shank is attached a chisel B fitted with a socket and joint, and fastened with a screw at M, at a convenient and suitable distance from the upper end of the shank is a swivel D, fitted so as to revolve around the shank, extending to E. having a joint at E and a handle at G. A post is fixed at H to support a small pulley I. A cord FF of sufficient size to work the chisel, passes through the handle to which it is made fast, over the pulley, through the swivel near the shank and a small staple Is, to the chisel, to which it is fastened by a pin. The hole in the rock to be blasted is to be bored to nearly the required depth in the ordinary way. Then the stone auger should be introduced into the hole thus bored, having a chisel attached to it, somewhat less than the hole, and the force is to be applied to the chisel by striking on the top of the shank, with a sledge or hammer or by elevating and forcing it down. The operator, by elevating and depressing the handle, by means of the cord F and the swivel D works the chisel by means of the joint at M, and thus enlarges the chamber.

3-30-1836 at the bottom of the hole, for the reception of the charge to any required dimen-
sion. A set of chisels figures 2. A. of different lengths and sizes and having
edges of different degrees of obliquity to the shank should be prepared, and in
readiness so that the size of the chamber for the reception of the charge may be
graduated and inequalities in the bottom of it, to a greater extent, cut off.
And, if necessary, a double set of chisels Figures 3. 4. E. H. may be fitted
in with cords, attached thereto in the same manner as has been already
described in the case of the chisel B, these cords to pass up on both sides of
the shank over the pulley and to be fastened to the handle, so that by elevating
and depressing the handle, the two chisels will be made to extend in opposite
directions and thus cut faster and smoother than with a single one, or the chisel
may fastened to the shank having a joint but without a screw, as in Figure
7. When the work with these chisels is completed, the bottom of the chamber
will still be uneven. An Auger E Figure 5 with a spring G, may
then be introduced — The shank of this auger should be so bent near the
bottom, and the edge of the chisel so arranged, that the chisel, when in-
troduced, will, upon being turned, cut that part of the chamber which could
not be reached by a common stone auger — The spring should be on the
opposite side of the shank to the sharpest angle of the chisel, and extend
downwards, so that the part G will hold the chisel to its place, and extend
the extreme point of the chisel into the chamber. The dust is removed
from the chamber by a scraper F Figure 6. consisting of a straight rod with
a spoon C, of a suitable size, attached to the lower end with a joint H,
A cord G is fastened to the spoon, and passes through a staple at K.
After the scraper is introduced into the chamber the operator by pulling the
cord and moving the rod, can reach and clear every part of the chamber —
When there is water in the hole the charge is introduced in the following
manner — A sack is prepared of leather, india rubber, or any other suitable
material, impervious to water, corresponding in shape with the size of the hole
and the chamber, Figure 8 so that the bottom of the sack when filled with
powder, will fill the chamber — In this sack is inserted a tin, or other
thin metallic tube extending downwards to the point where the sack becomes
enlarged. This sack and tube are then introduced into the hole, and charge 1555X 3-30-1836 92 stronger with powder. The chisels and shanks should be of iron and steel

What I claim as my invention and not previously known, in the above described machine is the connecting of said chisels to the shanks with a joint, and the mode of working them, enlarging the bottom of the chamber, so that a much larger charge may be introduced, and the force and effect of the charge, greatly increased, and the mode of constructing and working the auger with a spring also the constructing of the scraper with a spoon, fitted to the rod with a joint. In testimony that the above is a true specification of my said improvement as above described, I have hereto set my hand this twenty eighth day of December in the year of our Lord one thousand eight hundred and thirty five.

Witness

John Dibble }
Reuben Booth }

[illegible]

1095 nos

Drawing